(12) United States Patent
Zhang

(10) Patent No.: US 7,152,596 B1
(45) Date of Patent: Dec. 26, 2006

(54) CIRCULAR SAW BLADE BODY

(76) Inventor: You Min Zhang, No.69, Biyuan 2nd Road, Donggang District, Rizhao City, Shandong province, P.R. (CN)

( * ) Notice: Subject to any disclaimer, the term of this patent is extended or adjusted under 35 U.S.C. 154(b) by 0 days.

(21) Appl. No.: 11/228,869

(22) Filed: Sep. 15, 2005

(51) Int. Cl.
*B28D 1/04* (2006.01)

(52) U.S. Cl. ......................................................... 125/15

(58) Field of Classification Search .................. 125/15, 125/13.01; 451/449, 542, 543; 83/835, 83/676, 663, 698–41; 144/218
See application file for complete search history.

(56) References Cited

U.S. PATENT DOCUMENTS

| | | | | |
|---|---|---|---|---|
| 2,609,017 A | * | 9/1952 | Chapin | 83/842 |
| 3,872,763 A | * | 3/1975 | Kayahara | 83/835 |
| 4,867,025 A | * | 9/1989 | Eklof et al. | 83/835 |
| 4,962,748 A | * | 10/1990 | Schweickhardt | 125/13.01 |
| 5,012,792 A | * | 5/1991 | Kawata et al. | 125/15 |
| 5,351,595 A | * | 10/1994 | Johnston | 83/848 |
| 6,450,075 B1 | * | 9/2002 | Manzo | 83/171 |

* cited by examiner

*Primary Examiner*—Jacob K. Ackun, Jr.
(74) *Attorney, Agent, or Firm*—Raymond Y. Chan; David and Raymond Patent Group

(57) ABSTRACT

A circular saw blade body having a plurality of cutting teeth, at least one mounting hole, and an arrangement of cooling holes along a projected groove line. The arrangement of cooling holes help promote the removal of residual powder during usage of the blade and also increases the flow of air and/or cooling water in order to cool the saw blade body, thus resulting in a more effective blade and also extends the life of the blade.

11 Claims, 3 Drawing Sheets

CIRCULAR SAW BLADE BODY

BACKGROUND OF THE PRESENT INVENTION

1. Field of Invention

The present invention relates to a saw blade, and more particularly to a circular saw blade body.

2. Description of Related Arts

Cutting tools, such as the saw blade, are popularly employed in the cutting of hard, abrasive, difficult-to-cut materials, such as stone, concrete, and brick. Conventional circular saw blades comprises a circular saw blade body having a peripheral edge and a plurality of cutting teeth provided along the peripheral edge, wherein a plurality of curved grooves are spacedly provided along the peripheral edge and between two adjacent cutting teeth. The grooves are employed to increase the flow of air and/or water for blade cooling purpose. During cutting, such conventional saw blade have disadvantages such as, difficulty of removing residual powder, the high temperature when the blade is in use, the low efficiency, and the short life span.

SUMMARY OF THE PRESENT INVENTION

A main object of the present invention is to provide a cooler blade during cutting, by providing a plurality of cooling holes along the blade that works to cool the blade during use.

Another object of the present invention is to provide a blade that is efficient in removing residual powder from its face.

Another object of the present invention is to provide a blade that prevents stress propagation while cutting.

Another object of the present invention is to provide a blade that decreases noise during the cutting process.

Another object of the present invention is to provide a more durable blade with a longer life span.

Accordingly, in order to accomplish the above objects, the present invention provides a circular saw blade comprising:

a circular saw body having a mounting hole, an outer peripheral edge, and a circular body portion between the mounting hole and the peripheral edge, the circular body portion having three integrally connected disc-like portions, a circular center portion, a circular cutting portion, and a circular cooling portion, wherein the circular center portion is a planar disc-like element formed around the mounting hole, wherein the circular cutting portion is a planar disc-like element comprising a plurality of cutting teeth evenly formed along the peripheral edge to define a cutting groove between each of the two cutting teeth, wherein the circular cooling portion is a planar disc-like element integrally connected between the circular center portion and the circular cutting portion; and a cooling arrangement having a plurality of aperture sets formed in the circular cooling portion of the circular saw body, wherein each cutting groove in the circular cutting portion inwardly projects a groove line therefrom, the groove line extending from the cutting groove to the circular cooling portion, each of the aperture sets in the cooling portion having at least a through hole formed along the groove line of each of the cutting groove.

These and other objectives, features, and advantages of the present invention will become apparent from the following detailed description, the accompanying drawings, and the appended claims.

DETAILED DESCRIPTION OF THE PREFERRED EMBODIMENT

Figure 1:
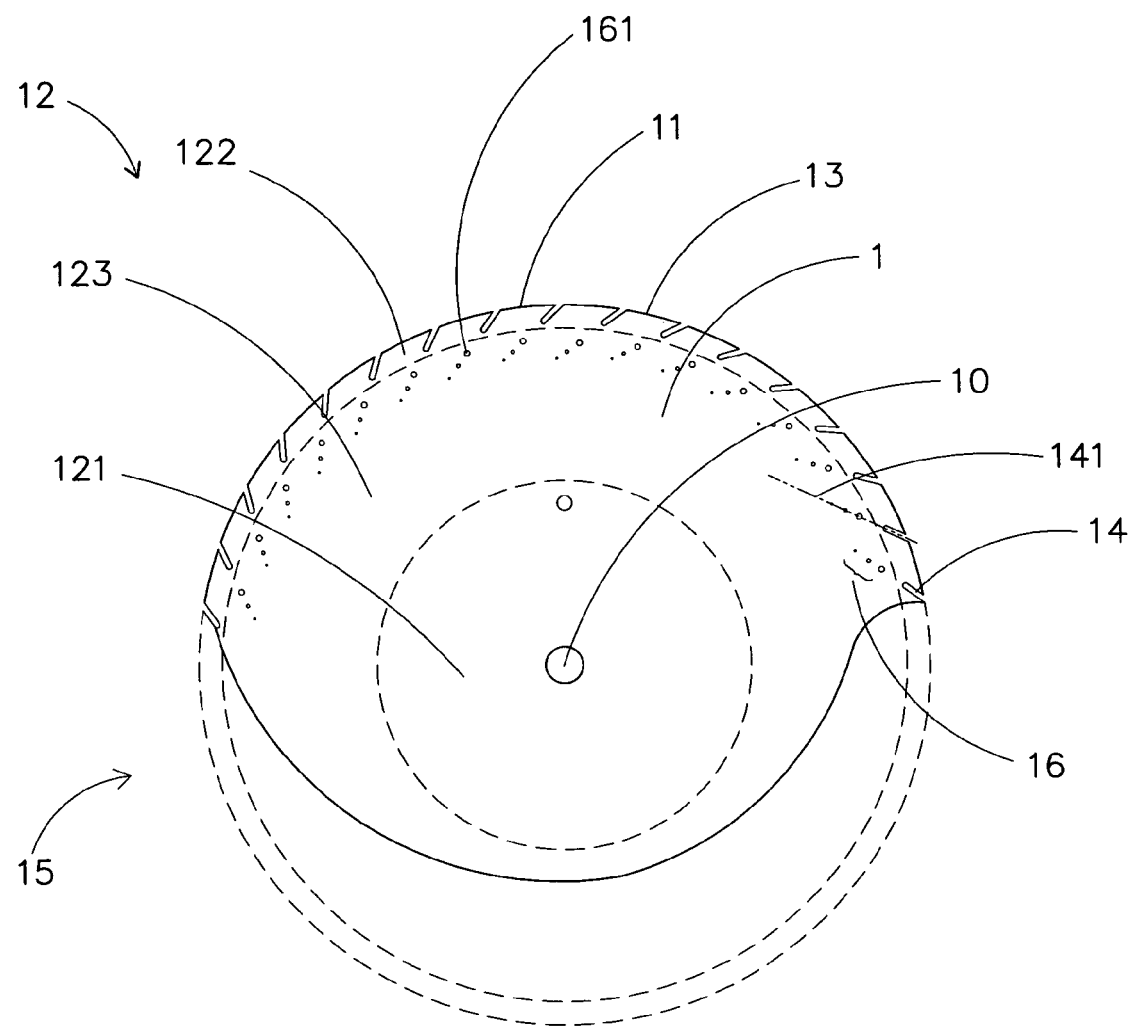
FIG. 1 is a circular saw blade body according to a first preferred embodiment of the present invention.
Figure 2:
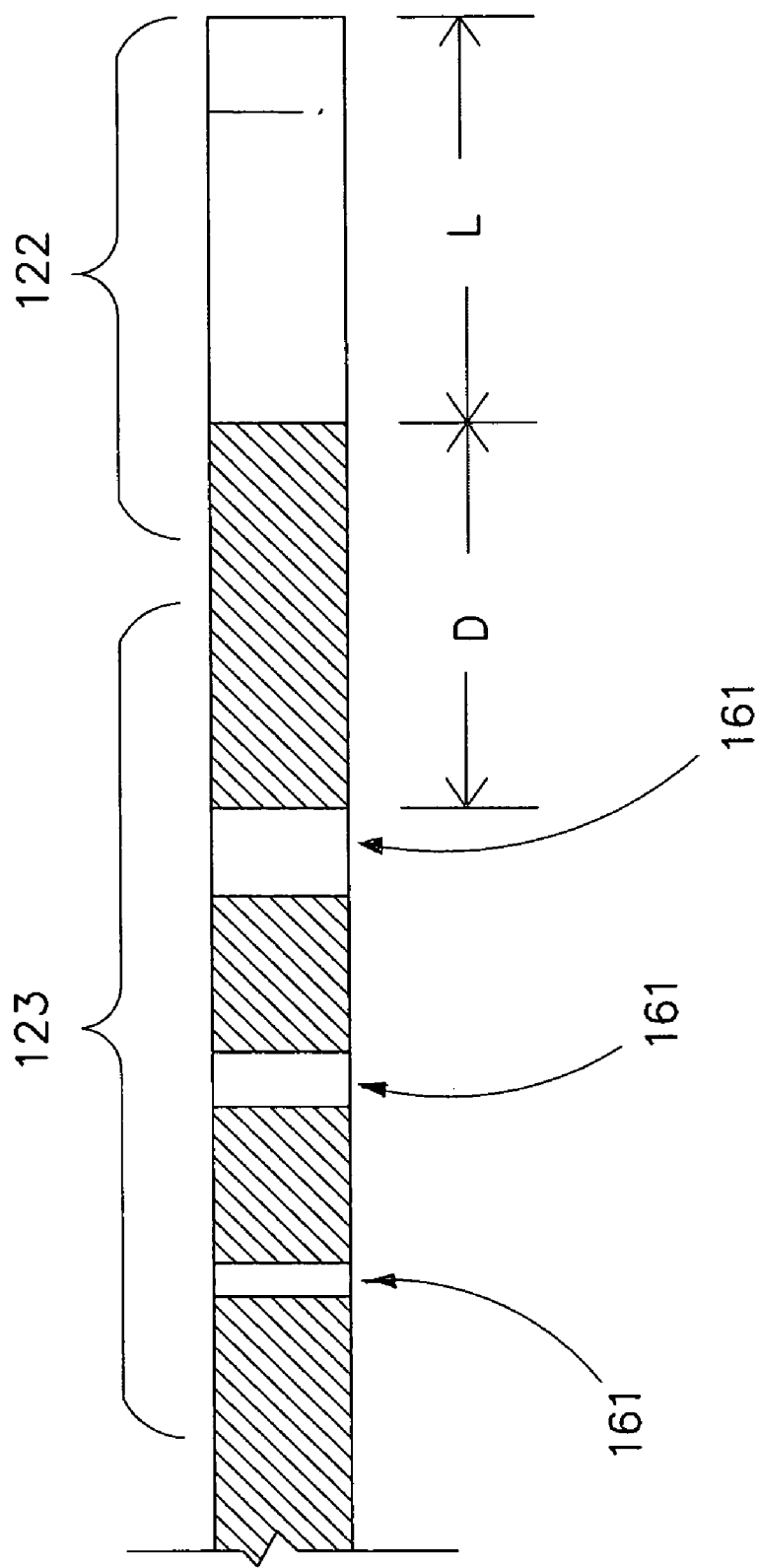
FIG. 2 is an amplified partially sectional view of the circular saw blade according to a preferred embodiment of the present invention.
Figure 3:
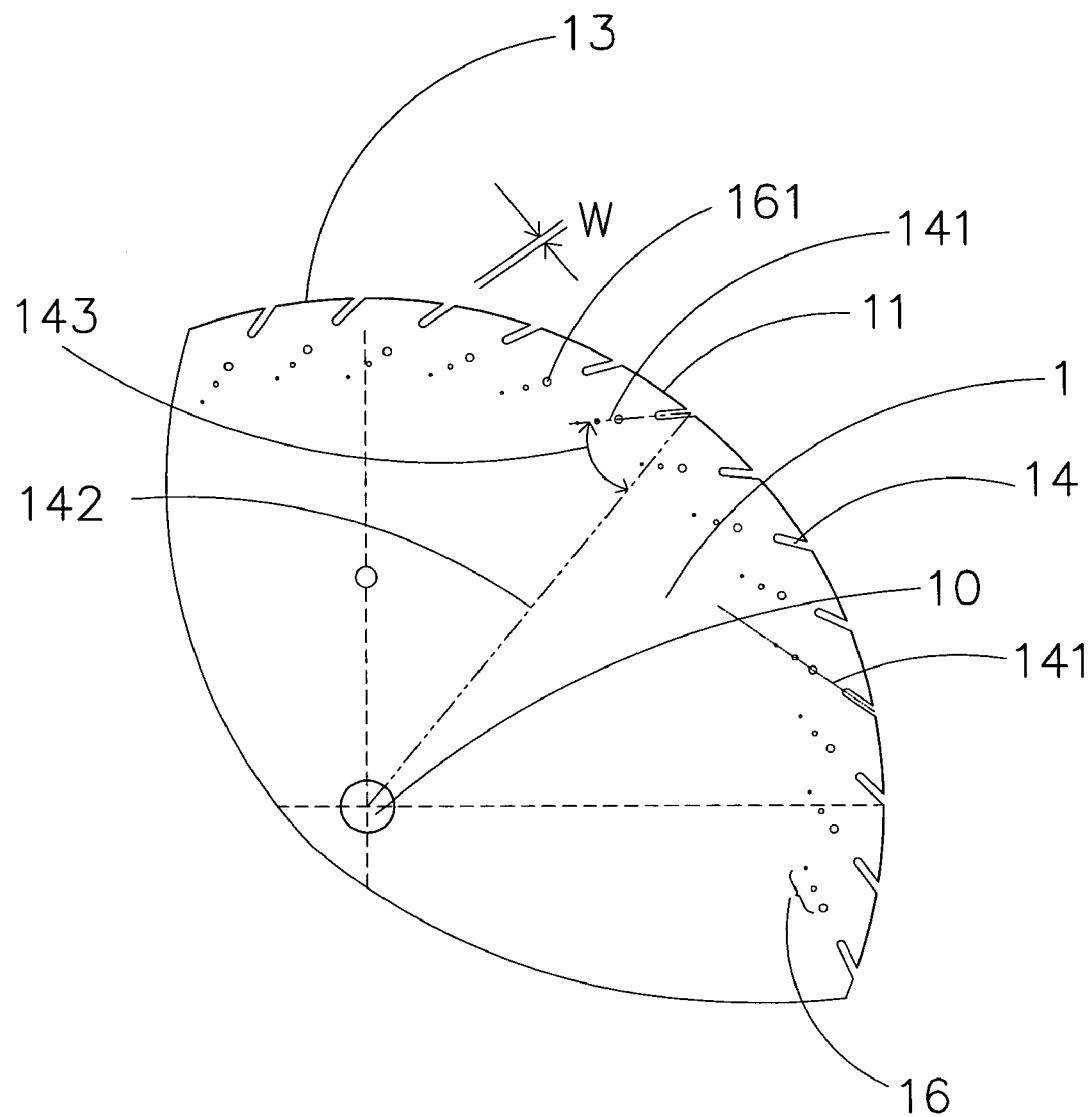
FIG. 3 is an exploded view of the circular saw blade body according to a first preferred embodiment of the present invention.

Referring to FIG. 1, FIG. 2, and FIG. 3, a circular saw blade body according to a first preferred embodiment of the present invention is illustrated, in which the circular saw blade comprises a circular blade body 1, having a mounting hole 10, outer peripheral edge 11, and a circular body portion 12 between the mounting hole 10 and the peripheral edge 11.

The circular body portion 12 has three integrally connected disc-like portions, a circular center portion 121, a circular cutting portion 122, and a circular cooling portion 123. The circular center portion 121 is a planar disc-like element formed around the mounting hole 10. The circular cutting portion 122 is a planar disc-like element comprising a plurality of cutting teeth 13 evenly formed along the peripheral edge 11 to define a cutting groove 14 between two cutting teeth. The circular cooling portion 123 is a planar disc-like element integrally connected between the circular center portion 121 and the circular cutting portion 122.

A projected path, along the longitudinal axis of the cutting groove 14 extending inward from the peripheral edge 11 of the circular blade body 1, forms a groove line 141. A radial line 142 projects from the outer peripheral edge 11 to the center of the circular blade body 1. The groove line 141 and the radial line 142 define a cutting angle α 143.

In the preferred embodiment, the cutting angle α 143 is an acute angle and is mainly dependent on the intensity desired of the blade. That and other factors that contribute to the efficiency and size of the blade will also determine the cutting angle α 143 formed between the radial line 142 and the groove line 141.

The circular saw blade also comprises a cooling arrangement 15 having a plurality of aperture sets 16 formed in the circular cooling portion 123 of the circular saw body 1. Each of the cutting grooves 14 in the circular cutting portion 121 inwardly projects a groove line 141. The groove line 141 extends from the cutting groove 14 to the circular cooling portion 123. Each of the aperture sets 16 in the cooling portion has at least a through hole 161 formed along the groove line 141 of each of the cutting grooves 14.

In the preferred embodiment, the aperture set provides with a plurality of through holes 161 formed along each groove line 141 of each cutting groove 14. The plurality of through holes 161 helps in the cooling of the blade during operation. It is worthy to mention that each aperture set may provide with one through hole 161 formed along the groove line 141 of each cutting groove 14.

For each aperture set 16, each through hole 161 in the groove line 141 gradually decreases in diameter along the groove line 141. In the preferred embodiment, the diameter of an outermost through hole is larger than the diameter of an innermost through hole, where the outermost through hole is the through hole closest to the peripheral edge 11 for each aperture set, and where the innermost through hole is the through hole farthest from the peripheral edge 11 for each aperture set. It is worthy to mention that the diameters of the through holes 161 in each aperture set may increase inwardly along the groove line 141 or may be constant along each groove line 141.

In the preferred embodiment, the outermost through hole is at a predetermined distance (D) from the cutting groove. The distance is determined according to the size and intensity desired to maximize the effect of the blade during operation.

The number of through holes 161 may vary from aperture set to aperture set. In the preferred embodiment, the number of through holes in the groove line 141 for each aperture set is dependent mainly on the intensity desired for the blade. Factors that contribute to the efficiency and size of the blade will also determine the number of through holes 161 in the groove line 141.

In the preferred embodiment, each of the through holes 161 in an aperture set is at the same cutting angle α 143, because the through holes 161 are along the same groove line 141. When the cutting groove 14 is aligned with the through holes 161, the efficiency in the cooling of the blade is increased.

The preferred embodiment is for the through holes 161 to be in the groove line 141 in a manner such that the through holes 161 are in a straight line. The reason for this is because of the better cooling of the blade during operation. However, it is worthy to mention that the through holes may be nonlinear.

In the preferred embodiment, for each aperture set, the through hole 161 along the groove line 141 has a width (W) equal to or smaller than the width of the cutting groove 14, where the width of the cutting groove is measured from one cutting teeth to an adjacent cutting teeth. This arrangement provides for a better cooling of the saw blade during operation. It is worthy to mention that the width of the through hole 161 may be larger than the width of the cutting groove 14.

In the preferred embodiment, the length of the cutting groove 14 is different from an adjacent cutting groove, where the length (L) of the cutting groove is measured from the outer peripheral edge 11 inwardly to a distance where the cutting groove extends to. The different lengths of the cutting grooves is preferable because such an arrangement enables the cooling and cutting of the operation to be more efficient.

The through holes 161 of each aperture set are spacedly placed along the groove line 141. The through holes are spaced in a manner that does not weaken the strength of the blade body 1, hence the through holes are not placed too close together. This cooling arrangement is of special importance and will contribute to the cooling effects and other above stated functions.

In the preferred embodiment, the cutting angle α 143 is an acute angle, therefore the cutting groove 14 extends non-radially inward from the peripheral edge 11 of the circular blade body 1. However, none of the groove lines 141 shall intersect with any of the other groove lines 141, so therefore, no aperture set shall intersect with any of the other aperture sets.

The circular center portion 121 of the circular saw body 1, which is a planar disc-like element formed around the mounting hole 10, may have one or more mounting holes depending on the make, model, and design of the blade.

During cutting, the air and cooling water along the grooves and through holes will assist in cooling down the saw blade and the product being cut. The contact area of the saw blade and the product being cut is decreased due to the cooling arrangement along the groove line. This helps to inhibit heating caused by friction.

During cutting, residual powder is aggregated around the saw and the product being cut. This cooling arrangement can help promote swift removal of residual powder from the saw blade and product being cut. This gives the circular saw blade more direct contact with the product, which results in higher efficiency.

During cutting, the impact and the heat produced from the impact induces stress on the saw blade. However, the cooling arrangement inhibits the stress from propagating inwards on the saw blade.

During cutting, the noise produced propagates outward from the center of the saw blade. This cooling arrangement can inhibit and reduce this propagation to avoid inducing syntony, thus decreasing noise.

The result of a cooler cutting condition and efficient removal of residual powder is a longer blade life. This is true in demanding applications where heat buildup and/or residual powder buildup are particularly problematic.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A circular saw blade, comprising:

a circular saw body having a mounting hole, an outer peripheral edge, and a circular body portion between said mounting hole and said peripheral edge, said circular body portion having three integrally connected disc-like portions, a circular center portion, a circular cutting portion, and a circular cooling portion, wherein said circular center portion is a planar disc-like element formed around said mounting hole, wherein said circular cutting portion is a planar disc-like element comprising a plurality of cutting teeth evenly formed along said peripheral edge to define a cutting groove between each of said two cutting teeth, wherein said circular cooling portion is a planar disc-like element integrally connected between said circular center portion and said circular cutting portion; and a cooling arrangement having a plurality of aperture sets formed in said circular cooling portion of said circular saw body, wherein each said cutting groove in said circular cutting portion inwardly projects a groove line therefrom, said groove line extending from said cutting groove to said circular cooling portion, each of said aperture sets in said cooling portion having one or more through holes spacedly formed along said groove line of each of said cutting groove in said cooling portion, wherein said cooling arrangement in circular cooling portion is provided for the cooling of said circular saw body during operation, wherein each of said groove lines extends inwardly in a non-radial manner with respect to a radial line of said circular saw body, wherein said radial line extends inwardly from said peripheral edge to a center of said circular saw body, wherein said groove line and said radial line define an acute cutting angle.

2. The circular saw blade, as recited in claim 1, wherein a width of each of said cutting grooves is equal to or larger than a diameter of said respective through hole in each of said aperture sets in said circular cooling portion.

3. The circular saw blade, as recited in claim 1, wherein a length of each said cutting groove is different from a length of adjacent cutting groove.

4. The circular saw blade, as recited in claim 1, wherein said through hole of each said aperture sets has a predetermined distance positioning away from said respective cutting groove.

5. The circular saw blade, as recited in claim 1, wherein a diameter of said through hole at an outermost position of each of said aperture sets is larger than diameter of said through hole at an innermost position of each of said aperture sets.

6. The circular saw blade, as recited in claim 5, wherein a width of each of said cutting grooves is equal to or larger than a diameter of each of said through holes in each of said aperture sets in said circular cooling portion.

7. The circular saw blade, as recited in claim 6, wherein a length of each said cutting groove is different from a length of adjacent cutting groove.

8. The circular saw blade, as recited in claim 1, wherein each of said aperture sets extends non-radially and inwardly along said respective groove line, wherein said aperture sets are non-intersected with each other in said circular cooling portion.

9. The circular saw blade, as recited in claim 7, wherein each of said aperture sets extends non-radially and inwardly along said respective groove line, wherein said aperture sets are non-intersected with each other in said circular cooling portion.

10. The circular saw blade, as recited in claim 8, wherein said through hole at said outermost position of each of said aperture sets has a predetermined distance positioning away from said respective cutting groove.

11. The circular saw blade, as recited in claim 9, wherein said through hole at said outermost position of each of said aperture sets has a predetermined distance positioning away from said respective cutting groove.

\* \* \* \* \*